Feb. 9, 1960 — R. A. GERLITZ — 2,924,166
FAN OPERATED DAMPER BLADE LATCH
Filed May 21, 1957 — 2 Sheets-Sheet 1
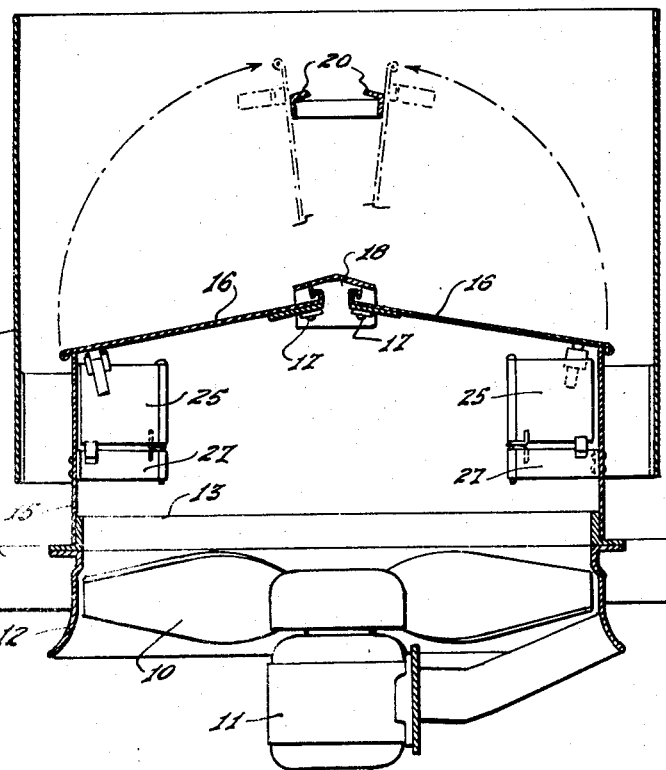
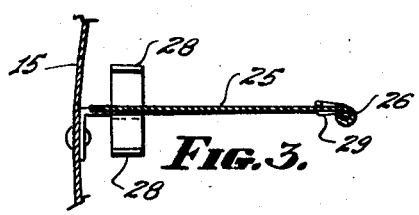
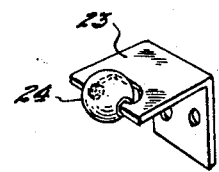
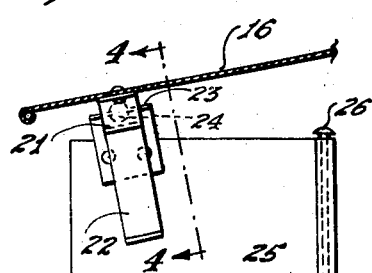
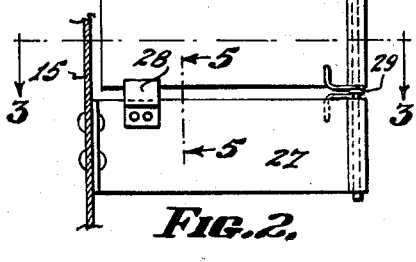
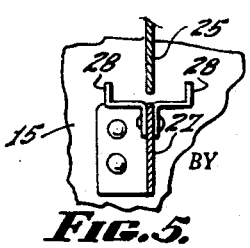
INVENTOR.
REUBEN A. GERLITZ,
BY
ATTORNEYS.

Feb. 9, 1960 — R. A. GERLITZ — 2,924,166
FAN OPERATED DAMPER BLADE LATCH
Filed May 21, 1957 — 2 Sheets-Sheet 2

INVENTOR.
REUBEN A. GERLITZ,
BY
ATTORNEYS.

United States Patent Office 2,924,166
Patented Feb. 9, 1960

2,924,166

FAN OPERATED DAMPER BLADE LATCH

Reuben A. Gerlitz, Springfield, Ohio, assignor to Robbins & Myers, Inc., Springfield, Ohio, a corporation of Ohio Application May 21, 1957, Serial No. 660,596

3 Claims. (Cl. 98—116)

This invention relates to a damper blade latch or a latch for shutters of a blower or fan.

In connection with such devices as industrial power roof ventilators as well as exhaust fans such as attic fans, kitchen fans and the like, it is customary to provide a shutter or damper which may be held in closed position by gravity or by means of a spring and which is opened by the air blast when the fan or blower is turned on. One of the problems in connection with fans having such dampers or shutters has been that when the fan or blower is not operating and the damper or shutter is closed, it has a tendency to flap open and shut when subjected to gusty winds. This is not only annoying but produces wear and tear on the dampers or shutters.

Attempts have been made to solve this problem with electrically or mechanically operated latches but such latches are cumbersome, complicated and costly, and they are not fool-proof in operation. In other instances attempts have been made to solve the problem by weighted blades of automatic dampers or shutters, but the weights on such dampers or shutters make them unusable with low velocity fans.

With the foregoing operations in mind, it is an object of the present invention to provide a fan operated damper latch which is fully automatic in its operation and which is extremely simple and sure. In some previous attempts to provide fan operated damper latches, a vane has been used which was intended to be actuated by the air stream produced by the fan. Such devices have not been successful for the obvious reason that a fan does not produce an air stream until the shutter or damper is open.

It is therefore a further object of the invention to provide a fan operated latch wherein the vane is disposed in a position to be operated by the rotational vortex which is always present at the discharge of a fan which is operating at a performance point of zero air volume.

It is still another object of the invention to provide a device as above outlined wherein the actuating vane is so disposed that it presents an edge to the air stream produced by the fan when the shutter or damper is open, so that it does not interfere with the air flow.

These and other objects of the invention which will be described in more detail hereinafter or which will appear to one skilled in the art upon reading these specifications are accomplished by that certain construction and arrangement of parts of which I shall now describe an exemplary embodiment.

Reference is made to the drawings forming a part hereof and in which:

Figure 1 is a cross-sectional view through a power roof ventilator having butterfly damper blades.

Figure 2 is an enlarged view of a portion of Figure 1 showing the latch mechanism in detail.

Figure 3 is a fragmentary cross-sectional view taken on the line 3—3 of Figure 2.

Figure 4 is a fragmentary cross-sectional view taken on the line 4—4 of Figure 2.

Figure 5 is a fragmentary cross-sectional view taken on the line 5—5 of Figure 2.

Figure 6 is an enlarged perspective view of the latching fingers.

Figure 7:
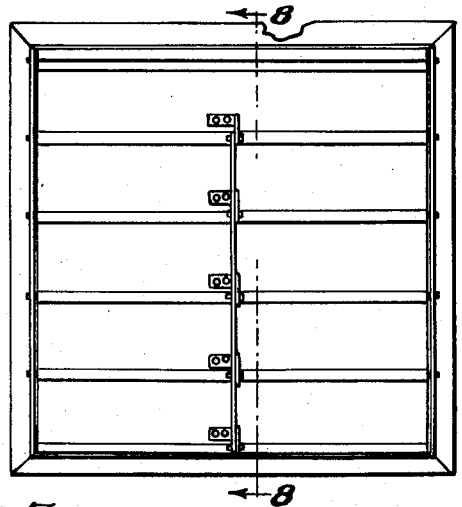
Figure 7 is an elevational view of a typical exhaust fan shutter.

Briefly, in the practice of the invention, I provide a latching means comprising a latching or locking lip secured to the vane or shutter and a latching or locking finger secured to a pivoted vane. The vane is disposed edge on to the air stream produced by the fan and is spring biased to latching position. The vane is disposed in relation to the fan in such manner that it will be actuated to unlatched position by the rotational vortex produced when the fan is operating at zero air volume because of the fact that the shutter or damper is closed.

Throughout the specification and claims, it should be understood that the words "damper" and "shutter" are used interchangeably and are intended to include a single blade structure or a multiple blade structure wherein the blades are mechanically tied together to operate in unison. It should also be understood that the word "fan" is used interchangeably with the word "blower" and is intended to cover all types of fans and blowers whether of the propeller type, the vaneaxial type or centrifugal type.

Referring now more particularly to Figures 1 to 6 inclusive, there is shown in Figure 1 an automatic damper stack associated with a power roof ventilator. The particular device shown in Figure 1 is of the type claimed in U.S. Patent No. 2,668,491, dated February 9, 1954, in the name of Reuben A. Gerlitz. In the structure of Figure 1, a fan 10 driven by a motor 11 and having a fan ring 12 and a mounting ring 13 is secured to a suitable roof member 14. Extending upwardly from the ring 13 is the damper housing 15 which is closed by means of the butterfly damper blades 16. These blades are pivoted at 17 and a suitable device for preventing the ingress of rain is provided at 18. The stack is indicated at 19. Abutments 20 are provided for the damper blades in open position and their open position is indicated in broken lines.

The blades 16 rest in the solid line position by gravity and under the influence of the air stream produced by the fan 10 they are raised to the position shown in broken lines.

Secured to each of the damper blades 16 by means of rivets or the like, as best seen in Figure 4, is a locking lip 21 provided with a cam portion 22. The lip 21 is adapted to be engaged by the locking finger 23 which is preferably provided with a ball 24 to provide frictionless operation. The member 23 is secured to a vane 25 which is pivoted by means of a pin 26 to a bracket 27. The member 27 is provided with the brackets 28 which constitute stops to limit the movement of the vane 25. The vane is biased to locking position by means of the torsion spring 29.

With the fan off, the parts will be in the position shown in solid lines in the various figures. When the fan 10 is started, the damper 16 being shut and latched, no air flow is created and the fan is operating at zero volume. However, the fan will create a rotational vortex in a plane substantially perpendicular to the drawing as seen in Figure 1, or in the plane of the drawing as seen in Figures 3 and 4. Under the influence of this rotational vortex, the vane 25 will be swung to the broken line position of Figure 4, releasing the ball 24 from the locking lip 21, whereupon the dampers are unlatched and can move to their broken line position in which they are held by the air stream created by the fan. It will be noted that while the vane 25 is in a position to present its maximum area to the rotational vortex, it is edge on to the air stream when the dampers are open so that it does not interfere with the air stream.

When the fan is shut off, the damper blades 16 will return by gravity from their broken line positions in Figure 1 to their solid line positions. In the meantime, of course, the vane 25 has righted by virtue of its spring bias to the locking position shown in solid lines. As the blade 16 reaches closed position, the cam surface 22 will abut the roller 24 and momentarily swing the vane toward the right, as seen in Figure 4, until when the blade 16 is fully closed the spring 29 can return the vane 25 to its solid line locking position.

Figure 9:
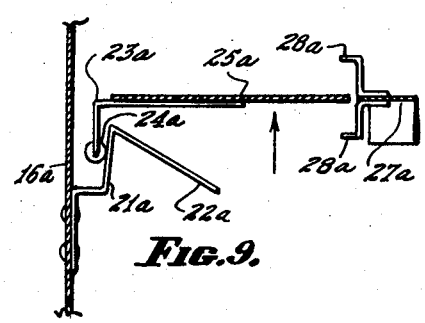
Figure 9 is an enlarged fragmentary cross-sectional view taken on the line 9—9 of Figure 8.
Figure 8:
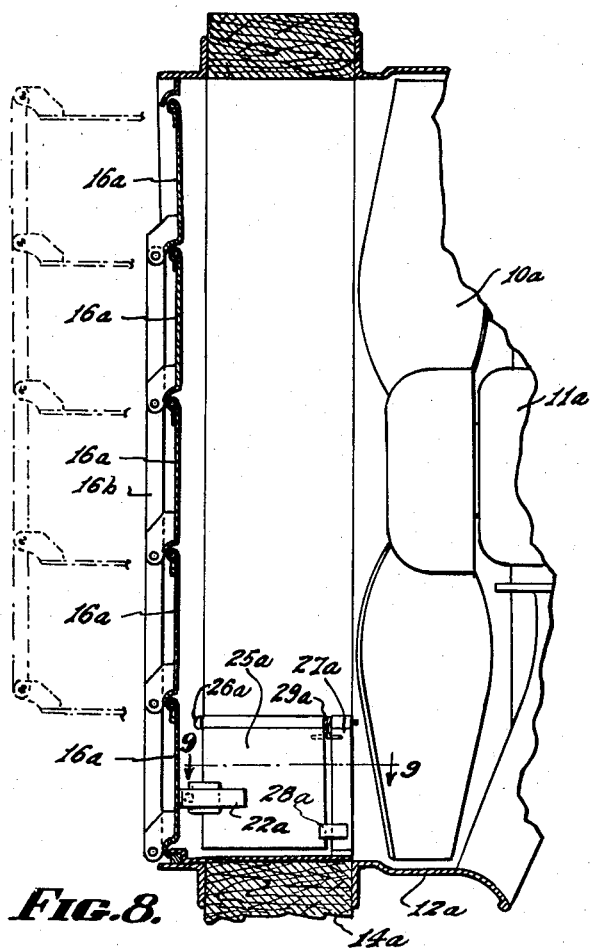
Figure 8 is an enlarged cross-sectional view taken on the line 8—8 of Figure 7.

Referring now to Figures 7 to 9 inclusive, the principles are exactly the same and the parts have been numbered with numerals corresponding to those Figures 1 to 6 but with the suffix "a." The structure shown in these figures, instead of being an industrial roof ventilator, is a typical domestic exhaust fan and instead of being mounted in a roof, it is mounted in a wall 14a and the axis of the vane is horizontal instead of vertical. Instead of the two damper blades there are shown a series of damper blades 16a which are linked together by means of a link 16b so that they operate in unison. The mechanism of the latch is exactly the same in all respects to that described in connection with Figures 1 to 6 inclusive.

Figure 10:
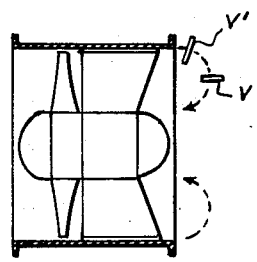
Figure 10 is a diagram showing how a device according to the present invention would be used with a so-called vaneaxial fan.
Figure 11:
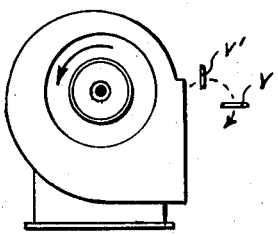
Figure 11 is a diagram showing how the device would be used with a centrifugal fan.

The structure described above may also be used with the so-called vaneaxial type of fan shown in Figure 10 in somewhat diagrammatic form or with a centrifugal blower shown diagrammatically in Figure 11. In both of these figures, the blowers or fans exhaust toward the right and the curved arrows indicate the direction of the rotational vortex when fans or blowers of these types are operating at zero volume. Preferably, the vane for actuating the latch will be placed at the position indicated in each drawing at V, in which all the vanes above described are obtained. The vane also be placed at the point indicated at V' although in this case a very slight interference with the air stream will result.

It will be understood that various modifications may be made without departing from the spirit of my invention. I therefore do not intend to limit myself except as set forth in the claims which follow.

Having now fully described my invention, what I claim as new and desire to secure by Letters Patent is:

1. In an axial flow fan having an automatic shutter on the exhaust side adapted to be held open by the air stream produced by said fan, and to close when there is no air stream to hold it open, and a shutter frame cooperating with said shutter; a latching device including a latching lip on the inside of said shutter, a vane mounted on said shutter frame inside said shutter in edgewise attitude to said axial flow so as not to impede said flow, and arranged for pivoting movement about an axis parallel to said axial flow under the influence of the rotational vortex created by said fan when running with said shutter in closed position, said vane carrying a detent finger in engagement with said latching lip when said fan is not running, whereby said rotational vortex produces pivoting movement of said vane to release said detent finger from said latching lip.

2. A device accordance to claim 1, wherein means are provided weakly to bias said vane to locking position.

3. A device according to claim 1, wherein said lip has a cam surface and said finger terminates in a roller, whereby when said shutter closes, said detent finger will be reengaged in locking relation to said lip.

References Cited in the file of this patent
UNITED STATES PATENTS

| | | |
|---|---|---|
| 2,141,923 | McMahan | Dec. 27, 1938 |
| 2,273,458 | Anderson | Feb. 17, 1942 |
| 2,489,446 | Biancani | Nov. 29, 1949 |